United States Patent
Suzuki et al.

[15] 3,699,178
[45] Oct. 17, 1972

[54] OXYCHLORINATION PROCESS

[72] Inventors: Yoshitaka Suzuki; Atsushi Takenoue; Hideo Kojima, all of Nagoya, Japan

[73] Assignee: Toagosei Chemical Industry Co., Ltd., Tokyo, Japan

[22] Filed: Feb. 12, 1968

[21] Appl. No.: 704,662

[30] Foreign Application Priority Data

June 23, 1967 Japan ..................42/39936

[52] U.S. Cl. ..........................260/659 A, 260/658 R
[51] Int. Cl. ......................C07c 17/02, C07c 17/04
[58] Field of Search ..260/659, 662 A, 662 R, 654 A, 260/654 H, 658 R, 659 A, 662 A; 252/477 R; 23/219

[56] References Cited

UNITED STATES PATENTS

| | | |
|---|---|---|
| 2,399,488 | 4/1946 | Hearne...................260/659 A |
| 2,866,830 | 12/1958 | Dunn et al..................260/650 |
| 3,184,515 | 2/1962 | Penner et al................260/658 |
| 3,454,663 | 7/1969 | Ryckaert et al.........260/659 A |
| 3,360,483 | 12/1967 | Diamond et al....260/659 A X |

Primary Examiner—Leon Zitver
Assistant Examiner—Joseph A. Boska
Attorney—Sughrue, Rothwell, Mion, Zinn & Macpeak

[57] ABSTRACT

In a process for the oxychlorination of a hydrocarbon, such as ethylene using Deacon catalyst containing copper chloride in a fixed catalyst bed system, the temperature distribution can be uniformly maintained throughout the catalyst bed and the selectivity of the reaction can be increased by arranging the catalyst bearing carrier particles in such a manner that the size of the particles in the reactor at the inlet side of feed gases is larger than that of the particles at the outlet side of product gases.

7 Claims, 3 Drawing Figures

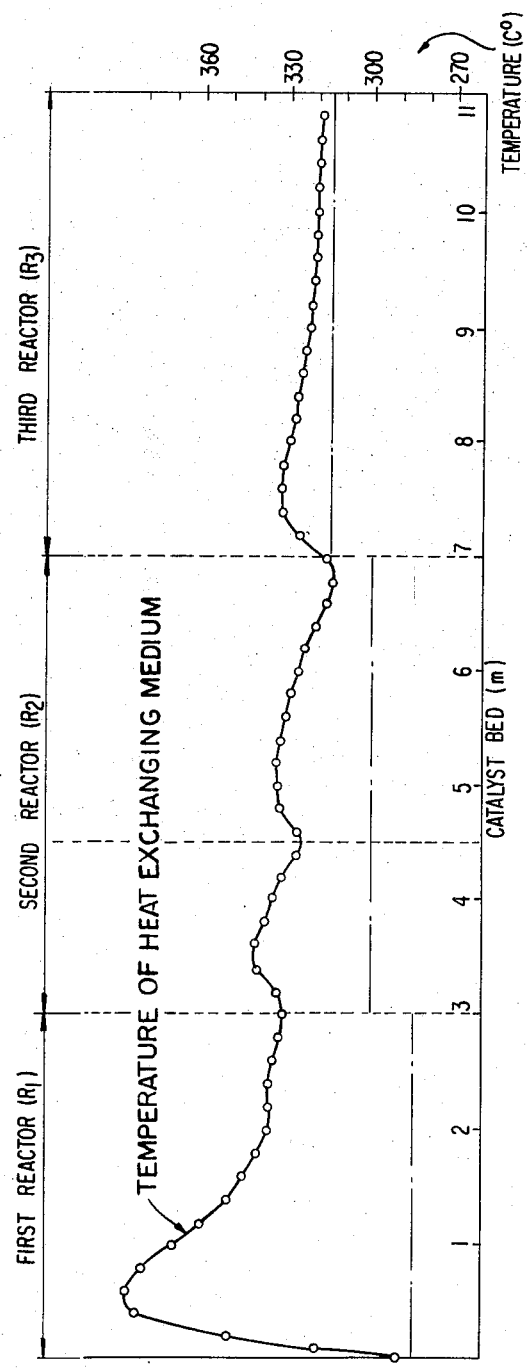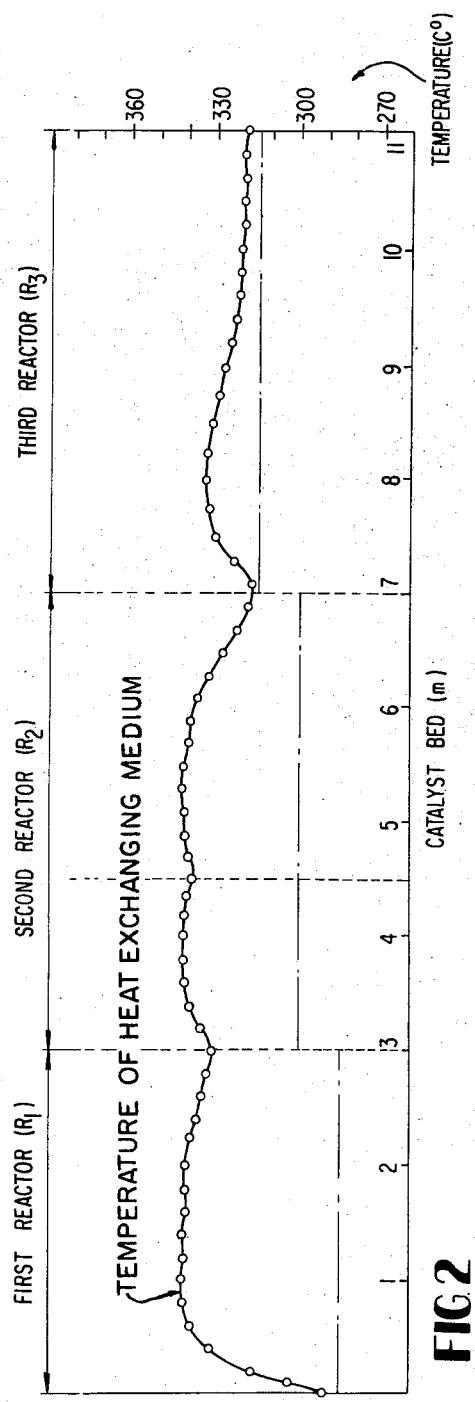

OXYCHLORINATION PROCESS

BACKGROUND OF INVENTION

This invention relates to an improved process for the oxychlorination of hydrocarbons or halogen substituted hydrocarbons and, more particularly, to an oxychlorination process wherein the selectivity of the oxychlorination is improved and the oxychlorination can be very effectively practiced, since the temperature of the fixed bed of catalyst is smoothly controlled.

It is well-known that saturated hydrocarbons such as methane and ethane, unsaturated hydrocarbons such as ethylene and propylene, or chlorinated hydrocarbons such as vinyl chloride and tetrachloroethane can be chlorinated by passing them together with hydrogen chloride and oxygen in the vapor phase over a catalyst at an elevated temperature. The reaction is generally called "oxychlorination" and there is used in the reaction a catalyst comprising mainly cupric chloride and an alkali metal chloride carried by an inactive porous material such as pumice stone, active alumina, silica and diatomaceous earth, etc.

However, such an oxychlorination reaction proceeds with a remarkable evolution of heat of reaction, and, in order to conduct the reaction with excellent selectivity, it is very important to control the temperature of the catalyst bed.

In the case where the reaction is conducted using a fixed bed of catalyst reaction system without any adequate measure to control the evolution of the heat of reaction, the reaction temperature cannot be adequately controlled due to the low heat conductivity of the catalyst bed, thereby tending to cause locally extraordinary high temperature zones or so-called "hot spots" in the catalyst bed.

In order t. maintain the temperature of the fixed bed of catalyst at a substantially uniform level all over the bed to improve the selectivity of the reaction, many proposals have been offered, e.g., adjusting the ratio of raw hydrocarbons to hydrogen chloride, diluting the feed gas mixture with a gas inert to the reaction, such as nitrogen and carbon dioxide, using an externally cooled tubular reactor having large heat-conductive areas and diluting the catalyst-bearing carrier particles with carrier particles themselves or other solid materials inert to the reaction, such as glass beads, carbon silicate and graphite, or diluting the catalyst particles with carrier particles in such a manner that an amount of the diluent particles is increasing in the direction in reverse of the flow of reactants.

These attempts are, however, insufficient where the catalyst-bearing carrier particles are mixed with a diluent and their mixing ratio is varied from the inlet side of the feed gas to the outlet side of the product gas. In fact, the catalyst-bearing carrier particles and the diluent particles cannot be packed uniformly in the reactor and, hence, the so-called "hot spots" tend to result. Further, even if the catalyst-bearing carrier particles and diluent particles are packed in the reactor uniformly, the lowering of the selectivity of the reaction cannot be avoided.

BRIEF DESCRIPTION OF INVENTION

This invention relates to a process free from these various disadvantages caused by the difficulty in temperature control. That is, in the oxychlorination process of this invention, the catalyst-bearing carrier particles in the fixed bed of catalyst are so distributed that the size of the particles be stepwise or gradually decreased from the inlet side of feed gases to the outlet side of product gases.

Thus, an object of this invention is to provide an improved process for maintaining a temperature of a fixed bed of catalyst at substantially uniform level throughout the catalyst bed in a so-called oxychlorination process wherein a gaseous mixture of hydrocarbons or chlorinated hydrocarbons, hydrogen chloride and oxygen in the vapor phase is passed through a fixed bed of catalyst.

Another object of this invention is to provide an oxychlorination process having an improved selectivity in the reaction and a high yield of chlorinated hydrocarbons.

Still another object of this invention is to provide an improved process capable of controlling effectively the reaction temperature even at an elevated pressure.

DETAILED DESCRIPTION OF INVENTION

Figure 1:
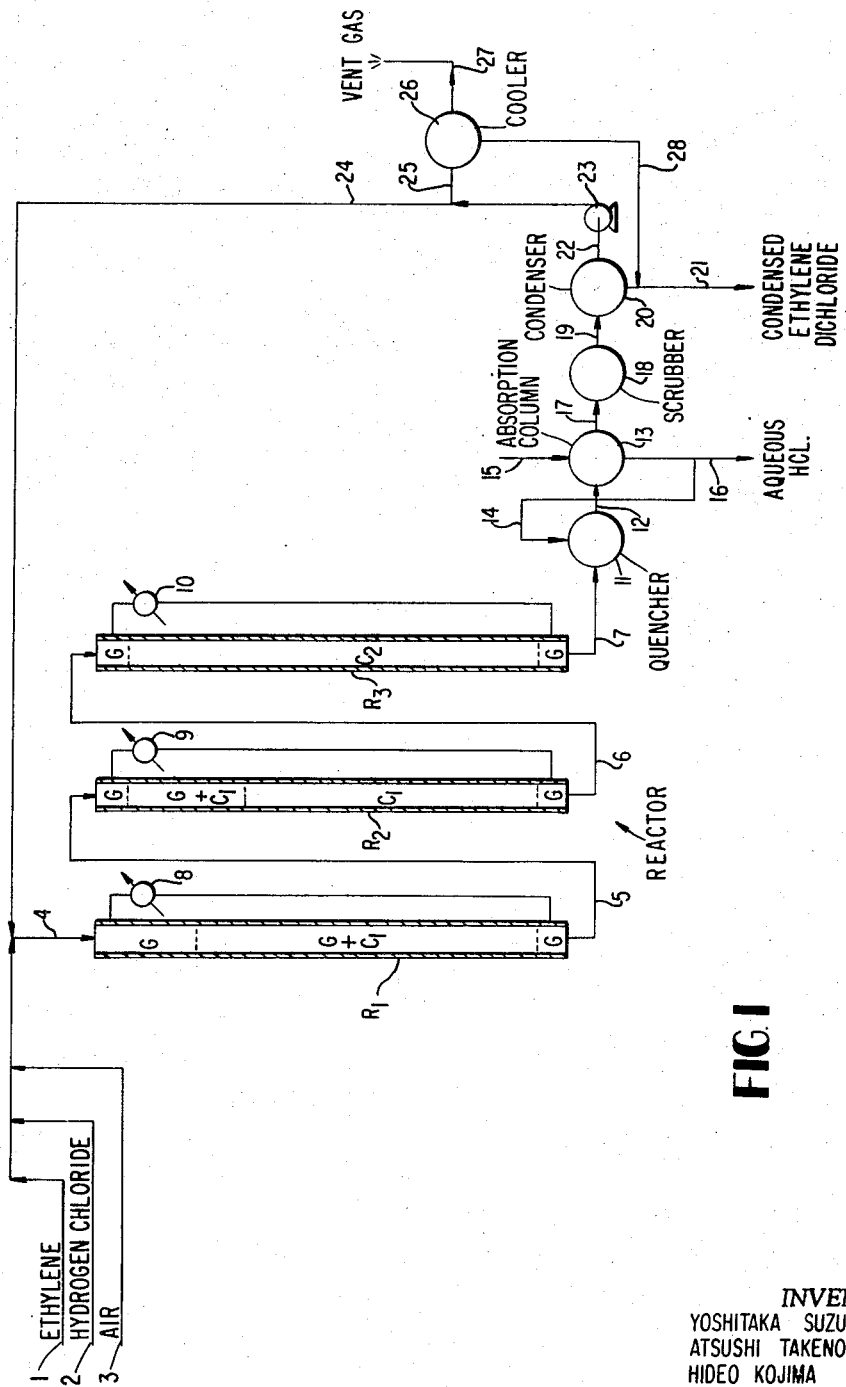

The process of this invention can be utilized for the oxychlorination of hydrocarbons, more specifically, ethylene. The process of this invention is also effectively used for preparing ethylene dichloride by the oxychlorination of ethylene.

In accordance with the process of this invention, ethylene dichloride can be produced from ethylene with a remarkably improved selectivity. The main features and the specified embodiments of the process of this invention may be illustrated by the following examples of preparing ethylene dichloride from ethylene.

According to an embodiment of the process of this invention, the catalyst-bearing carrier particles are distributed in the reactor in the manner such that the size of the particles is reduced stepwise or gradually from the inlet side of feed gases to the outlet side of product gas. This is because the catalyst-bearing carrier particles having a large grain size have a low reaction accelerating power and, hence, if such large catalyst-bearing carrier particles are present near the inlet side of feed gases where the concentration of raw gases are high and the reaction tends to occur vigorously, the reaction at the inlet side of feed gases will be sustained. On the other hand, as the catalyst-bearing carrier particles having a small grain size have a high reaction-accelerating power, hence when such catalyst particles are used at the outlet side of reaction product gases, the reaction in that portion will be promoted, even if the concentration of raw gases are low.

Therefore, in the process of the present invention, the catalyst-bearing carrier particles are distributed through the fixed bed of catalyst in the reaction system in a manner such that the particle size thereof at the inlet side of feed gases is larger than that of the particles at the outlet side of reaction product gases. By this arrangement, the rate of reaction and the heat of reaction generated can be uniformly controlled throughout the entire fixed bed of catalyst. Therefore, it becomes possible to conduct very effectively the oxychlorination and to improve remarkably the reaction selectivity.

In the process of this invention, as the size of catalyst particles packed in the reactor decreases in the direction of flow of reactants gas mixture and, therefore, the packing density of the catalyst particles in the reactor increase in said direction, it is expected that the loss of pressure in the reactor would be higher. The oxychlorination reaction, however, is a volume-decreasing reaction. Therefore, there is no great pressure loss in the reaction of this process. Moreover, if a definite value of pressure loss is permitted in the reaction, as the catalyst is packed densely in the process of this invention, the reactor is constructed with minimum space. This fact is also one of the desirable advantages of this invention.

The particle size of the catalyst-bearing carrier particles used in the process of this invention may be determined by the capacity of reactor, the composition of the starting reactant gases, the amount of reactants to be introduced into the reactor, the reaction pressure used, and the efficiency of the cooling device used in the reactor, etc. The particle size of the catalyst-bearing carrier particles may be selected and determined by preliminary experiments using a predetermined reactor at predetermined reaction conditions. In the preliminary experiments, a reaction is conducted by using some definite size of catalyst particles at first, and then the reaction is conducted by a catalyst particle smaller than that of the first. If the apparent reaction velocity of the second reaction is greater than that of the first, the catalyst is replaced again with much smaller catalyst particles and the reaction is conducted in the same manner as the first and second reactions. In this manner, one can obtain the catalyst size which makes the apparent reaction velocity of the reaction almost constant. Also, it is desirable that the minimum size of the catalyst particles used in that reactor at that reaction condition be the same size to or a little larger size than the size of catalyst particles determined in the manner as above, to obtain excellent temperature control, and to minimize pressure loss in the reactor.

As the catalyst-bearing carrier particles of this invention, there may be used any form of the catalyst particles small in deviation of the individual particles in size, such as globular, cubic pillar-shaped or cylindrical form. The size of the catalyst particles may be represented by an apparent diameter: $[(1 + b + h)/3]$, wherein $1$ is an average particle length, $b$ is an average particle width, and $h$ is an average particle height.

In the fixed bed of catalyst used in the process of this invention, a ratio of an average apparent particle size of catalyst packed at the first part of the reactor to that of the end part of the reactor may be selected from the range of 1.2 – 3.0:1, more preferably of 1.5 –2.0:1.

In the case where a tubular reactor of the size from 30 to 40 mm in inner diameter is used, globular particles of 3 –4 mm in diameter, cylindrical particles of 3 –4 mm in diameter and 3 – 4 mm in height, or any other form of catalyst particles of the equivalent apparent size are packed at the end part of the reactor, and particles having 1.2 – 3.0 times as large of size are packed at the first part of the reactor.

In an industrial application of the process of this invention, it is preferred to divide the reactor into several reaction zones and to pack the individual zones with catalyst-bearing carrier particles having different particle sizes instead of varying the particle sizes continuously from one end to the opposite end of the reactor.

This process may also be conducted by using the catalyst particles together with catalyst diluent in a known manner, and the inventors have found that quartz glass and silicate glass having lower porosity of globular, cylindrical and other forms may be most preferably employed as the diluent for the catalyst. The glass of lower porosity is superior to the porous diluent such as silicon carbide, graphite, silica, and alumina known as the catalyst diluent. For example, on an industrial scale operation of the oxychlorination reaction, contamination of the catalyst particles with ferric chloride is usually unavoidable, but since the adsorption of ferric chloride on the glassy material can be prevented due to its low porosity, the formation of ethyl chloride by the catalytic action of ferric chloride in the preparation of, e.g., ethylene dichloride from ethylene can be markedly prevented by using the glassy material as the diluent, and, hence, ethylene dichloride can be always produced with a high yield.

The catalyst diluent used in this process has almost the same particle size as the catalyst-bearing carrier particles, and it is preferred to use the diluent in larger amount at the inlet side of feed gases, and smaller amount at the outlet side of reaction product gas. In some cases, it is preferred to use no diluent at the end part of the catalyst bed but only to use the catalyst-bearing carrier particles.

The Deacon type catalyst-bearing carrier particles containing copper chloride to be used in the process of this invention may be a known catalyst comprising an active composition mainly composed of cupric chloride and assistant components, such as, an alkali metal salt, or an alkali earth metal salt and a salt or an oxide of molybdenum, chromium, cobalt, nickel, titanium, vanadium, tin, manganese, and bismuth, said active composition being supported or adsorbed on a porous carrier.

Especially, the catalyst containing copper chloride, potassium chloride; and molybdenum chloride as the active components of the catalyst has no tendency of volatilizing the active components off from the catalyst even at a temperature higher than 320° C, and, hence, there are less formations of trichloroethane, cis- and trans-dichloroethylene, ethyl chloride, trichloroethylene, vinyl chloride and carbon dioxide caused by the substitutive chlorination or dehydrochlorination reaction.

The supported catalyst used may be prepared according to any known manner such as an immersion method, a mixing method, or a precipitating method. As the carrier for supporting the catalyst, there may be employed active carbon, pumice stone, active alumina, silica, diatomaceous earth and the like.

The oxychlorination reactor used in this process may be constructed by an anti-corrosive material such as stainless steel, monel (trademark), nickel, inconel (trademark), tantalum and the like. The inventors have found that the reactor constructed of steel or stainless steel pipes lined with glass may be preferably used in the oxychlorination using a catalyst mainly composed of copper chloride. That is, in the oxychlorination reaction, generally copper chloride is used as the main component of the reaction catalyst and at the reaction temperature employed, said copper chloride turns into a semi-fused state and attacks the reactor material violently. Therefore, the catalyst is contaminated by the chloride of reactor material. For example, when stainless steel is used as the reactor material, ferric chloride and nickel chloride are deposited on the catalyst-bearing carrier, which tends to promote the occurrence of undesirable side-reactions.

However, When a glass-lined reactor is used, the corrosion of reactor material by the copper chloride may be avoided and, hence, there can be prevented the contamination of catalyst with the aforesaid corrosive products followed by the occurrence of undesirable side reactions.

In carrying the process of this invention, the reaction may be conducted at a normal pressure or elevated pressure and when 2 – 3 kg/cm² of pressure is employed, the temperature of the fixed bed of catalyst is adequately controlled to prevent the formation of "hot spots" in the bed.

Also a preferred space velocity of the starting gas mixture is in the range of 250 to 1,000 liters/hr (N.T.P.).

During the reaction, the temperature of the reaction is maintained at 200°–300° C usually employed in a conventional oxychlorination reaction.

When a glass-lined reactor is used in the oxychlorination reaction, there are no problems of corrosion of the reactor and contamination of the catalyst.

In the practice of the process of this invention, the relative ratio of the reactants in the feed gas mixture may be determined in accordance with the stoichiometric amounts of the reactants required to carry out the desired reaction.

In the reaction to produce ethylene dichloride from ethylene, the amount of hydrogen chloride is from 1.9 to 2.3 moles, preferably from 2 to 2.2 moles per mole of ethylene and the amount of oxygen is from 0.25 to 0.3 moles per mole of hydrogen chloride.

Further, in carrying out the process of this invention, it is preferred to use air as the oxygen source to avoid the occurrence of side reactions and troubles in any stage of the reaction procedure. And, further, it is preferred to recycle into the reaction zone the uncondensible gas separated from the chlorinated hydrocarbons formed from the reaction product gases, whereby the concentrations of oxygen and the hydrocarbons in the reaction mixture can be maintained at a relatively low level to operate the reaction in a less dangerous state, that is, the occurrence of an explosive concentration state can be avoided even when the feeding of hydrogen chloride into the reaction is reduced or is stopped.

When the reaction of this invention is conducted under the condition described above in detail, there is obtained 96 – 98 percent of one through-conversion ratio of ethylene and 97 – 98 percent of the selective conversion ratio into ethylene dichloride.

The following examples will illustrate preferred embodiments of this invention in which all percentages and parts are by molar and by weight and pressure is given in gauge pressure unless otherwise stated.

EXAMPLE 1

The layout of the reactor used in this example is illustrated in the FIG. 1 attached.

The reaction zone of this reactor is composed of the fixed bed of supported catalyst particles diluted with quartz glass beads and the fixed bed of supported catalyst particles without diluent.

The reactor used in this example has three vertical stainless steel pipes of 36.7 mm in inside diameter and 4.5 meters in length and each group of series connected pipes have a cooling jacket.

The first pipe in which the raw feed gases are charged, is called first reactor $R_1$, and the next and the third pipes are called second reactor $R_2$ and third reactor $R_3$, respectively. The temperature of the catalyst bed is controlled by circulating heat exchanging medium which is adjusted to a suitable temperature by heat exchangers 8, 9, and 10, through the jackets of each reactor.

At the gas inlet portion and the gas outlet portion of each of the reactors, there are bed of quartz beads G 6 mm in diameter for preheating the gas and supporting the catalyst bed. The thickness of said quartz beads bed is 0.25 m, except that of the gas inlet portion of $R_1$ being 1.25 m.

In reactor $R_1$, there is a fixed bed of catalyst consisting of one part by volume of cylindrical catalyst-bearing carrier particles $C_1$ of 7 mm in diameter and 7 mm in height and one part by volume of said quartz beads G of 6 mm in diameter.

In reactor $R_2$, the portion of 0.25 m in length adjacent to the gas inlet and gas outlet thereof are, as mentioned above, packed with only quartz beads but a second section of 1.5 m in length next to the quartz bead portion adjacent to the gas inlet is packed with a fixed bed of catalyst consisting of 2 parts by volume of cylindrical catalyst-bearing carrier particles $C_1$ of 7 mm in diameter and 7 mm in height and 1 part by volume of quartz beads G of 6 mm in diameter and the remaining portion of the reactor $R_2$ is packed with the catalyst particles $C_1$ only.

In reactor $R_3$, cylindrical catalyst-bearing carrier particles $C_2$ of 4 mm in diameter and 4 mm in height are packed only.

The catalyst used in this example is prepared by supporting 12 parts of cupic chloride, 6 parts of potassium chloride and 3 parts of molybdenum oxide on 79 parts of diatomaceous earth.

A compressed gas mixture of ethylene, hydrogen chloride and air is charged into reactor $R_1$ from an external source through conduits 1, 2 and 3, respectively, via conduit 4 after dilution with gases mainly composed of nitrogen supplies from conduit 24. The gaseous mixture is preheated to a predetermined temperature in the glass beads layer G in reactor $R_1$ and then is reacted in the catalyst bed of reactor $R_1$. The reaction mixture formed is then withdrawn from reactor $R_1$ via conduit 5 and again introduced into second reactor $R_2$. The reaction mixture in reactor $R_2$ is withdrawn via line 6 and charged into third reactor $R_3$. An effluent of the reaction product from reactor $R_3$ of a temperature from 310° C to 320° C is charged into quencher 11 through conduit 7. In the quencher 11 said hot gas is contacted with aqueous hydrogen chloride solution supplied from hydrogen chloride absorption column 13 through line 14, to quench the gas.

The gas steam is quenched to about 105° C in the quencher 11, is then charged into the hydrogen chloride absorption column 13 through line 12, where it is contacted with water supplied from conduit 15 to remove most of hydrogen chloride in the gas stream without condensing ethylene dichloride.

A part of the aqueous hydrogen chloride solution formed in absorption column 13, is withdrawn from absorption column 13 through line 16 and the other is sent to quencher 11.

The gas stream having a temperature of about 100° C and almost free from hydrogen chloride is charged into scrubber 18 through line 17 and is washed with a diluted caustic alkali solution of a temperature of about 60° C to remove hydrogen chloride completely from the gas stream without condensing ethylene dichloride. The resulting gas stream, completely free from hydrogen chloride, is then charged into ethylene dichloride condenser 20 through line 19, whereby the gas stream is cooled to about 5° C to condense ethylene dichloride. The condensed ethylene dichloride is then withdrawn from condenser 20 through line 21.

Uncondensible gas containing a small amount of ethylene dichloride is supplied to compressor 23 through line 22, whereby the gas is compressed to the reaction pressure and a part of the compressed gas is recycled to reactor $R_1$ via line 24. The remainder of the gas is charged into deep cooler 26 through line 25 and cooled to from $-20°$ to $-30°$ C to recover ethylene dichloride from the gas completely. The ethylene dichloride-removed gas is vented to open air through line 27. The ethylene dichloride thus recovered in the cooler 26 is combined with line 28 together with ethylene dichloride stream obtained in the condenser 20.

By using the aforesaid reaction apparatus, compressed ethylene, hydrogen chloride and air are charged into reactor $R_1$ via conduits 1, 2 and 3 respectively and after diluting them with 2 N M$^2$ of the recycled gas mainly composed of nitrogen to provide a gas mixture having a whole volume of 8 N M$^3$, which is then introduced into reactor $R_1$. The gas mixture comprises 13.1 percent ethylene, 27.0 percent hydrogen chloride, 7.3 percent oxygen and 52.6 percent nitrogen and the space velocity of feeds gas to the catalyst bed is about 700 l/hr.

The heat exchanging medium circulated in the jacket of the reactors is maintained at a temperature from 280° C to 320° C and when the feed gas is introduced into reactor $R_1$ at a pressure of 3.5 kg/cm$^2$ the pressure of reaction mixture at the outlet of reactor $R_3$ is 2.9 kg/cm$^2$.

The reaction is conducted at said reaction condition for 500 hours and then the temperatures of various portions of catalyst bed are measured. The temperature gradient obtained is shown in FIG. 2 in the accompanying drawings. From the result shown in FIG. 2, it is easily understood that by the process of this invention, the temperature control of the catalyst bed may be effected and substantially uniformal temperature distribution all over the catalyst bed is obtained.

By conducting the reaction as above, 96.8 percent of ethylene and 95.2 percent of hydrogen chloride are converted, and the selective conversion ratios based on ethylene converted are 97.1 percent for ethylene dichloride, 1.8 percent for 1,1,2-trichloroethane and 0.8 percent for ethyl chloride.

The reaction is repeated by using the same reactors and same reaction conditions except using only catalyst particles $C_2$ instead of catalyst particles $C_1$ in reactor $R_1$ and reactor $R_2$. (The catalyst particles are diluted with the same quartz glass beads as example 1.) After 500 hrs reaction, temperature of various portions of catalyst bed are measured as above and the results obtained are shown in FIG. 3. In the latter case, when the feed gas is introduced into reactor $R_1$ at a pressure of 3.5 kg/cm$^2$, the pressure at the outlet of the reactor $R_3$ is 2.1 kg/cm$^2$.

In the above reaction, the conversion ratios of ethylene and hydrogen chloride are 97.0 percent and 95.9 percent, respectively, and the selective conversion ratios based on ethylene converted are 95.6 percent for ethylene dichloride, 3.2 percent for 1,1,2-trichloroethane and 0.9 percent for ethyl chloride.

Comparing the example of this invention (the former) to the example not adapting the idea of this invention (the latter), there is a remarkable difference in temperature distribution of the catalyst bed, and it is easily understood that the process of this invention is very effective to equalize the temperature of the catalyst bed, and at the same time to increase the selectivity of the desired chlorinated hydrocarbons (in this example, ethylene dichloride).

EXAMPLE 2

In this example, the oxychlorination reaction of ethylene is carried out by using the same reaction apparatus and reaction conditions employed in Example 1, except that the inner wall of the reactors used are lined with glass of 1 mm in thickness.

After 500 hrs. reaction, the reaction mixture having a pressure of 2.85 kg/cm$^2$ is obtained at the outlet of reactor $R_3$. By conducting the reaction as above 96.5 percent of ethylene and 95.0 percent of hydrogen chloride are converted, producing ethylene dichloride in 97.5 percent, 1,1,2-trichlorethane in 1.8 percent and ethyl chloride in 0.4 percent based on ethylene converted.

In this example, as the reactors are lined with glass and the amount of catalyst used is smaller than the case of Example 1, the conversion of ethylene is slightly lower than that of Example 1 but selectivity of the product is still at a high level.

Comparing the results obtained in this example to the results obtained in Example 1, it is noticable that the formation of ethyl chloride is very small in this example.

What is claimed is:

1. In a process for the production of chlorinated hydrocarbons by an oxychlorination reaction by passing an organic reactant selected from the group consisting of hydrocarbons and chlorinated hydrocarbons, together with hydrogen chloride and oxygen through a fixed bed of Deacon catalyst bearing carrier particles containing copper chloride, the improvement which comprises using a fixed bed wherein the particle size of the catalyst bearing carrier particles decreases stepwise or gradually from the feed gas inlet side of the bed to the reaction product outlet side of the bed.

2. The process according to claim 1 in which said organic reactant is ethylene.

3. The process according to claim 1 in which the ratio of the apparent diameter of the catalyst bearing carrier particles at the feed inlet of the bed to the apparent diameter of said particles at the product outlet of the bed is less than 3, the apparent diameter being defined as $(1 + b + h)/(3)$, wherein $1$ is an average particle length, $b$ is an average particle width and $h$ is an average particle height.

4. The process according to claim 1 in which the fixed bed contains glass beads, as a diluent, in addition to the catalyst-bearing carrier particles.

5. The process according to claim 4, in which the glass beads are present at a level of from 0.5 to 3.0 times by volume to the volume of the catalyst-bearing carrier particles.

6. The process according to claim 1 in which said bed is contained in a reactor lined with glass.

7. The process according to claim 1 additionally comprising, removing the hydrogen chloride from the product gas stream, cooling the resultant gas stream to condense out the greater part of the formed chlorinated hydrocarbons, compressing the uncondensible gas to the reaction pressure and recycling a part of the compressed gas to the reactor.

* * * * *